(12) United States Patent
Hladik, Jr.

(10) Patent No.: US 8,914,444 B2
(45) Date of Patent: Dec. 16, 2014

(54) MANAGING CHAT SESSIONS

(75) Inventor: William J. Hladik, Jr., Harrisburg, NC (US)

(73) Assignee: International Business Machines Corporation, Armonk, NY (US)

(*) Notice: Subject to any disclaimer, the term of this patent is extended or adjusted under 35 U.S.C. 154(b) by 1911 days.

(21) Appl. No.: 11/493,111

(22) Filed: Jul. 25, 2006

(65) Prior Publication Data
US 2008/0028032 A1 Jan. 31, 2008

(51) Int. Cl.
*G06F 15/16* (2006.01)
*G06Q 10/10* (2012.01)

(52) U.S. Cl.
CPC .................. *G06Q 10/109* (2013.01)
USPC ....................................... 709/206

(58) Field of Classification Search
CPC .................. G06Q 10/109; H04L 65/4007
USPC ................. 709/206, 207, 204, 205, 227
See application file for complete search history.

(56) References Cited

U.S. PATENT DOCUMENTS

| | | | |
|---|---|---|---|
| 5,247,438 A | 9/1993 | Subas et al. | 364/400 |
| 6,606,611 B1 | 8/2003 | Khan | 706/10 |
| 6,917,610 B1 | 7/2005 | Kung et al. | 370/352 |
| 7,299,257 B2 * | 11/2007 | Boyer et al. | 709/204 |
| 2002/0178011 A1 | 11/2002 | Yotoriyama et al. | 704/275 |
| 2004/0153456 A1 | 8/2004 | Charnock et al. | 707/10 |
| 2005/0030937 A1 | 2/2005 | Wick et al. | 370/352 |
| 2005/0114191 A1 | 5/2005 | Atkin et al. | 705/8 |
| 2005/0120306 A1 | 6/2005 | Klassen et al. | 715/765 |
| 2005/0149880 A1 | 7/2005 | Postrel | 715/808 |
| 2005/0192999 A1 * | 9/2005 | Cook et al. | 707/102 |
| 2005/0203892 A1 | 9/2005 | Wesley et al. | 707/3 |
| 2006/0129626 A1 * | 6/2006 | Fitzpatrick et al. | 709/200 |
| 2007/0186172 A1 * | 8/2007 | Sego et al. | 715/753 |

OTHER PUBLICATIONS

"Time Zone Converter form +1 International Phone Code" http://wwp.greenwichmeantime.com/time-zone/usa/us-phone-codes.htm.
WorldTime (v1.3) http://www.visionetech.com/mobile/worldtime.asp.

* cited by examiner

*Primary Examiner* — Yves Dalencourt
(74) *Attorney, Agent, or Firm* — Lisa J. Ulrich; Yee & Associates, P.C.

(57) ABSTRACT

Computer system, method and program product for managing a chat session having a plurality of participants. A server sends to each participant in the chat session, a current local time of each other participant in the chat session. A workstation of each participant in the chat session displays an identity and current local time of each other participant in the chat session. The current local time of each other participant in the chat session can be represented by a graphical representation of the current local time of each other participant in the chat session. The server also sends to each participant in the chat session a current date of each other participant in the chat session. The workstation of each participant in the chat session displays the current date of each other participant in the chat session.

21 Claims, 5 Drawing Sheets

MANAGING CHAT SESSIONS

FIELD OF THE INVENTION

The present invention relates generally to computer systems and the Internet, and more specifically to electronic chat sessions.

BACKGROUND OF THE INVENTION

Chat sessions, such as provided by Microsoft Instant Messenger program, IBM SameTime program, Microsoft MSN Messenger program, Microsoft Windows Messenger program, Yahoo Instant Messenger program, and AOL Instant Messenger program, are well known today. Typically, a person at a client workstation initiates the chat session by invoking his or her chat session client program and identifying one or more other people to participate in the chat session. The person can identify the other people to participate in the chat session by accessing a directory, selecting individuals from a predefined list of people or selecting a predefined group of people. Then the person requests that his or her client computer send to a server, the identifications (such as e-mail addresses or IP addresses) of the people to participate in the chat session. In response, a chat session server program tries to connect to the client workstations of the other people selected to participate in the chat session to determine if the other people are currently on-line. For any of the client workstations of these other people that are currently on-line, the server creates the chat session by invoking their respective chat session client program and identifying the members of the chat session. For any of the client workstations of these other people that are not currently on-line, the server notifies the originator that such people are not available for a chat session at this time. Next, any of the members of the chat session can type a message into a text field on their client workstation, and then "send" the message. In response, the respective chat session client program sends the message to the server, and the server sends it to the other participants in the chat session. In some implementations of chat client programs, communication between clients is done on a peer to peer level, i.e. directly from client to client without mediation by or assistance from a server program. In either implementation, the effect is the same and there is the appearance that the clients are communicating directly to each other in the chat sessions. In response to a chat session message, the client workstations that receive the message will display the message, along with the identity of the sender. In the same manner, other participants can subsequently type a new message at their respective client workstation, and that new message along with the identity of the sender appears on the client workstations of the other workstations, nearly in real time.

Some people leave their client computers on-line most the time, even when they are not available such as when they are off duty, at lunch, away from the office or even sleeping. If another person attempts to create a chat session with a person who has left his or her computer on-line but is not available, the server will nevertheless ping the client computer, receive a favorable response and assume that the person is available to participate in the chat session. Consequently, the server will establish the chat session with this unavailable person, and the initiator may assume that this other person is available. The initiator of the chat session or other available participants, if any, in the chat session may then assume that the unavailable person is reading the chat messages, when that is not the case. This may lead to misunderstandings, omissions in work assignments, etc.

A known IBM Blue Pages program provides a directory of employees worldwide. Under the covers, as known to the industry, this is an LDAP (Lightweight Directory Access Protocol) implementation. When an employee is accessed via the IBM Blue Pages directory, a web page displays directory information (for example, telephone number, geographic location, manager, etc.) as well as the current local time of the employee, and a picture of the globe with a vertical stripe indicating the time zone of the home office of the employee. Also, a brightness of the globe indicates the time of day, i.e. if the local time is midday, the globe will be bright, if the local time is twilight, the globe will be grayish and if the local time is night, the globe will be dark. The IBM Blue Pages directory web page also states the shift of the employee, i.e. first, second or third.

A Lotus Notes Calendar program displays to a person who schedules a meeting the normalized local times of invitees.

An object of the present invention is to help inform participants in a chat session when another participant, presumably joined into the chat session, is not really available for a chat session even through his or her computer is on-line.

SUMMARY OF THE INVENTION

The present invention resides in a computer system, method and program product for managing a chat session having a plurality of participants. A server sends to each participant in the chat session, a current local time of each other participant in the chat session. A workstation of each participant in the chat session displays an identity and current local time of each other participant in the chat session.

According to a feature of the present invention, the current local time of each other participant in the chat session can be represented by a graphical representation of the current local time of each other participant in the chat session.

According to another feature of the present invention, the server sends to each participant in the chat session a current date of each other participant in the chat session. The workstation of each participant in the chat session displays the current date of each other participant in the chat session.

DETAILED DESCRIPTION OF THE PREFERRED EMBODIMENTS

Figure 1:
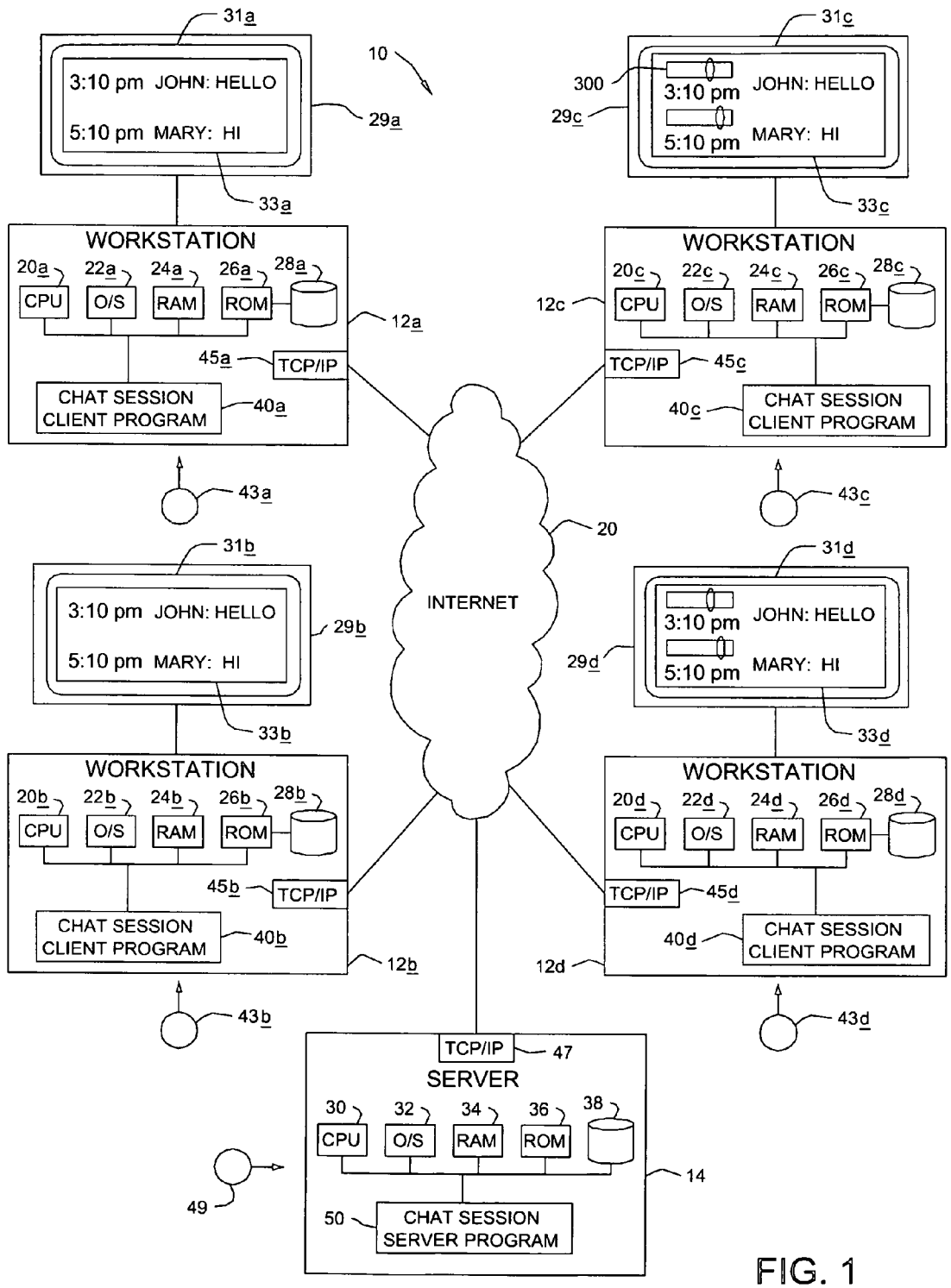
FIG. 1 is a block diagram of a distributed computer system, including client workstations with respective chat session client programs and a server computer with a chat session server program, which incorporates the present invention.

The present invention will now be described in detail with reference to the figures. FIG. 1 illustrates a distributed computer system generally designated 10. System 10 comprises workstations 12a,b,c,d and a server 14 interconnected via the Internet 20. The workstations 12a,b,c,d include respective CPUs 20a,b,c,d, operating systems 22a,b,c,d, RAMs 24a,b,c,d, ROMs 26a,b,c,d, storages 28a,b,c,d, and monitors 29a,b,c,d according to the prior art. Workstations 12a,b,c,d also include respective chat session client programs 40a,b,c,d with known functions to initiate and participate in a chat session via a chat session server program 50 in server 14. In addition, each of the chat session client programs 40a,b,c,d includes a time display program function according to the present invention to obtain from a chat session server program 50 and display alphanumerically the current local time of each other participant in the chat session. Also, the time display program function can optionally obtain from chat session server program 50 and display graphically a time icon representing the current local time of each other participant in the chat session.

Server 14 includes a CPU 30, operating system 32, RAM 34, ROM 36 and storage 38, according to the prior art. Server also includes chat session server program 50 with a known chat session server function to establish a chat session with two or more participants upon request by one participant and forward chat session messages created by one participant to the other participants. Chat session server program 50 also includes a time management program function according to the present invention to determine a local time of each participant in a chat session, and send the local time in alphanumeric form of each participant in the chat session to each other participant in the chat session. The time management program function of chat session server program 50 also includes an optional feature to generate a graphical representation of the local time of each participant in the chat session and the send the graphical representation of the local time of each participant in the chat session to each other participant in the chat session. Each participant in the chat session then can display the local time in alphanumeric form and optionally display the graphical representation of the local time of each other participant in the chat session at their respective workstations adjacent to their respective chat session window. Alternately, instead of the server program 50 sending the graphical representation of the local time of the participant to the client program, the client program may generate it based on alphanumeric local time of the participant sent by the server program.

FIG. 1 also illustrates examples of displays 31a,b,c,d on client workstation monitors 29a,b,c,d. Displays 31a,b,c,d include respective chat session windows 33a,b,c,d. Chat session windows 33a,b have been configured to display only the current local time in alphanumeric form of each other participant in a chat session, whereas chat session windows 33c,d have been configured to display the current local time in both alphanumeric form and graphical representation of each other participant in the chat session. Program instructions are stored in functional form in a computer readable storage for execution by CPUs 20a, 20b, 20c, and 20d via memories associated with the CPUs. In these examples, memories include, for example, RAMs 24a,b,c,d, RAM 34, ROMs 26a,b,c,d, and ROM 36. In these illustrative examples, storages 28a,b,c,d, and storage 38 are examples of computer readable storage media. The program instructions can be run by a CPU via the memory in a computer.

Figure 2A:
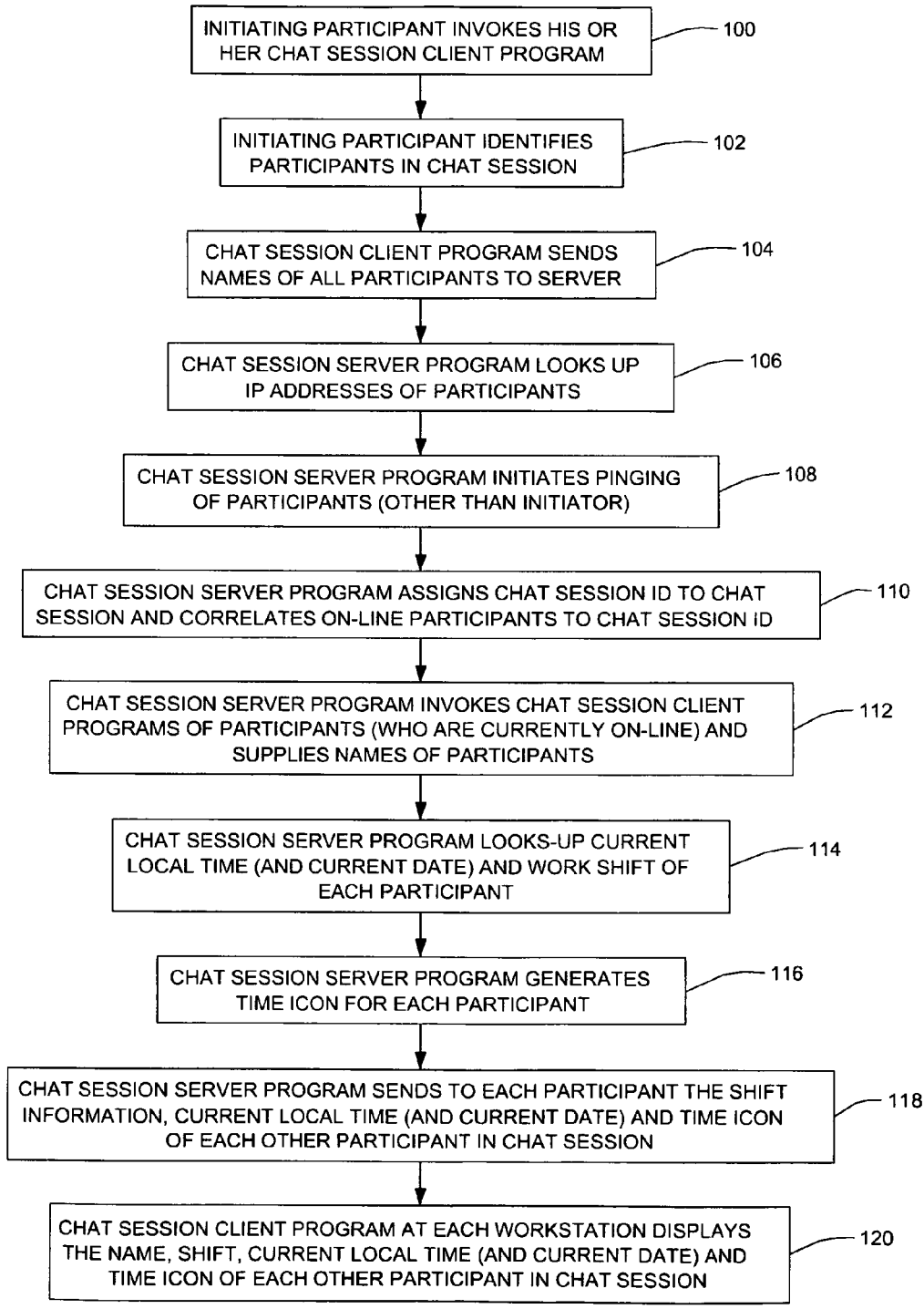
FIGS. 2(A-B) form a flow chart of each of the chat session client programs and the chat session server program of FIG. 1.
Figure 2B:
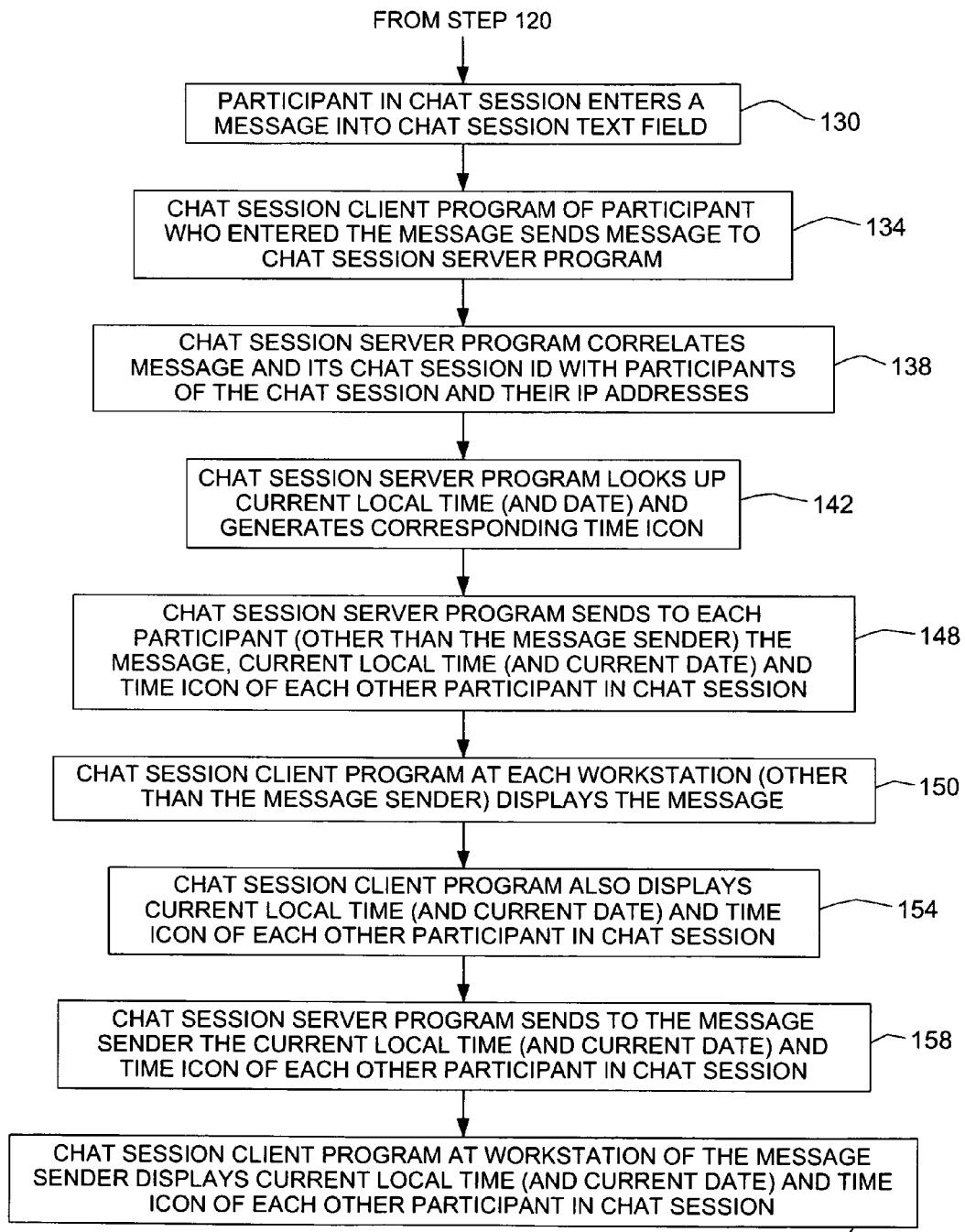

FIGS. 2(A-B) form a flow chart of the function and operation of chat session client programs 40a,b,c,d and chat session server program 50. To initiate a chat session with one or more other people at one or more other workstations, an initiator (person) invokes his or her chat session client program (step 100) and selects the names of the one or more other people to participate in the chat session (step 102). The initiating person can look up the other people in a directory or select the other people from a "buddy" list or other list previously defined by the initiating person. Alternately, the initiating person can select a group icon representing a predefined group of people to participate in a chat session. For purposes of explanation, assume that the user of workstation 12a initiates the chat session and selects the users of workstations 12b,c,d to participate in the chat session. In response, the chat session client program 40a workstation sends the names of the selected people to server 14 (step 104). In response, chat session server program 50 looks up the IP address of the workstation(s) 12b,c,d of the selected people (step 106) and then pings the workstation(s) 12b,c,d to determine if the workstation(s) 12b,c,d are currently on line (step 108). Chat session server program 50 then assigns a chat session ID to this chat session, and correlates the names of all the participants in the chat session to the chat session ID (step 110). Chat session server program 50 then invokes the chat session client programs of such other workstations 12b,c,d which are currently on line, and supplies these workstations 12b,c,d as well as the workstation of the initiating person with the names of all the people in the chat session (whose workstations are currently on-line) and the chat session ID (step 112). Assume that workstations 12b,c,d are all on-line. (If any of the workstations 12b,c,d was not on-line, then server 50 would not include its user in the chat session.) In addition, the chat session server program 50 looks up from a directory (such as IBM Blue Pages directory) the current local time (and date) of the home base/work location of each participant in the chat session and the work shift, if any, of each participant (for example, first, second or third) (step 114). (Optionally, if the participant is noted as "mobile" in the directory, chat session server program 50 queries the mobile workstation of the mobile participant to determine its current location from a GPS device installed in the mobile workstation.) Chat session server program 50 then generates a time icon for each participant to graphically represent the current local time of the participant. Chat session server program 50 also sends to workstations 12a,b,c,d (i.e. the workstation of each participant in the chat session) the shift information, current local time (and date) and corresponding time icon for each other participant in the chat session (step 118). Thus, chat session server program 50 sends to workstation 12a the shift information, current local time and corresponding time icon for the participants at workstations 12b,c,d. Chat session server program 50 sends to workstation 12b the shift information, current local time and corresponding time icon for the participants at workstations 12a,c,d. Chat session server program 50 sends to workstation 12c the shift information, current local time and corresponding time icon for the participants at workstations 12a,b,d. Chat session server program 50 sends to workstation 12d the shift information, current local time and corresponding time icon for the participants at workstations 12a,b,c. In response, the chat session client program at each workstation displays adjacent to a chat session window on their workstation the names of the other people in the chat session along with their work shift information, current local time and optionally the corresponding time icon representing their current local time (step 120). Each workstation displays the time icons only if it is configured to display the time icons. The current time of day and optionally the time icon advise each participant in the chat session as to the work shift and current local time of each other participant in the chat session. Consequently, each participant has some information indicating the likelihood that each other participant in the chat session is really present at his or her workstation. For example, if the current local time of a participant is 3 AM and the person works first shift, then it is unlikely that the person is really present at his or her workstation even though the workstation is currently on line and responded to the ping from server 50. However, if the current local time of a participant is 3 AM but the person works third shift, then it is likely that the person is really present at his or her workstation.

Next, one of the participants in the chat session, such as the user of workstation 12a, types a message into a text field of the chat session on monitor 29a (step 130). In response, the chat session client program sends the message (and a chat session ID) to server 14 (step 134) where chat session server program 50 correlates the chat session ID with the participant (s) in the chat session and the IP addresses of their workstations (step 138). In response, chat session server program 50 looks up the latest current local time of each participant and generates a corresponding time icon. Next, chat session server program 50 sends the current local time, corresponding time icon and message (sent by workstation 12a) to the workstations 12b,c,d of the other participants in the chat session, and the local chat session client program 40b,c,d displays the current message in the chat session window of the respective workstation 12b,c,d (step 150). Workstations 12b,c,d also display the updated current local time and corresponding time icon of each participant adjacent to the name of the participant (step 154). Chat session server program 50 sends the current local time and corresponding time icon to workstations 12a of the other participants in the chat session (step 158), and the local chat session client program 40a displays the updated current local time and corresponding time icon of each other participant in the chat session adjacent to the name of each other participant (step 160). Other participants in the chat session can similarly enter and send messages to the other participants in the chat session. Each time a new message is sent, the current local time and corresponding time icon is updated (where configured) on all workstations 12a,b,c,d.

FIGS. 3(A-F) illustrate one example of a time icon 300 with six different possible settings represented by six different locations of a vertical oval. The time icon 300 has an overall rectangular shape. A bright sun is illustrated in the left portion of the rectangle to represent morning, and a moon is illustrated in the right portion of the rectangle to represent night time. Proceeding to the right from the bright sun the colors turn from yellow to red to represent the progression of the day from daylight to sunset. Proceeding further to the right from the red region/sunset, the colors progress from light gray to black to represent the progression of the evening from twilight until darkness. FIG. 3(A) includes a vertical oval at the left most region of the rectangle, over the sun, to represent morning as the current local time. FIG. 3(B) includes a vertical oval to the right of the sun, over a yellow region, to represent mid day as the current local time. FIG. 3(C) includes a vertical oval over an orange region to represent afternoon as the current local time. FIG. 3(D) includes a vertical oval over the light gray region to represent dinner time as the current local time. FIG. 3(E) includes a vertical oval over a gray region to represent late evening as the current local time. FIG. 3(F) includes a vertical oval over the right most region of the rectangle, over the moon, to represent night as the current local time.

Optionally, as illustrated in FIGS. 3(A-F), each of the time icons 300 includes a respective line segment 304(A-F) under that portion of the rectangle that corresponds to the person's work shift. As illustrated in FIGS. 3(A) and 3(D), the person works first shift, so a line segment 304a appears under the left third of the rectangle. As illustrated in FIGS. 3(B) and 3(E), the person works second shift, so a line segment 304b appears under the middle third of the rectangle. As illustrated in FIGS. 3(C) and 3(F), the person works third shift, so a line segment 304c appears under the right third of the rectangle.

Figure 3A:
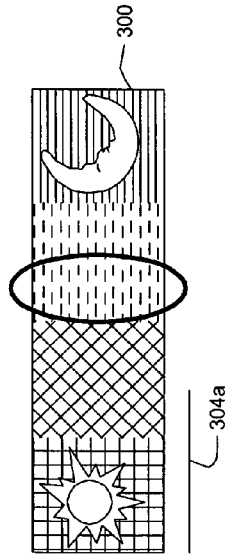
FIGS. 3(A-F) illustrate time icons to represent the current time of day of the participants of a chat session.
Figure 3B:
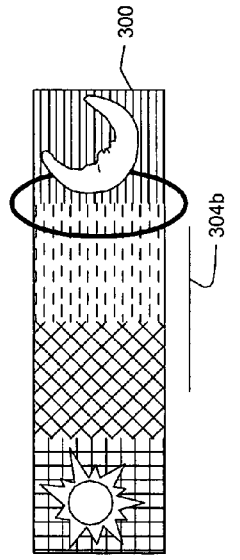
Figure 3C:
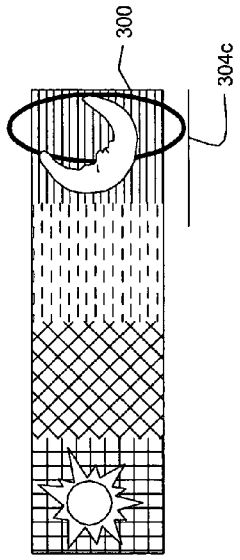
Figure 3D:
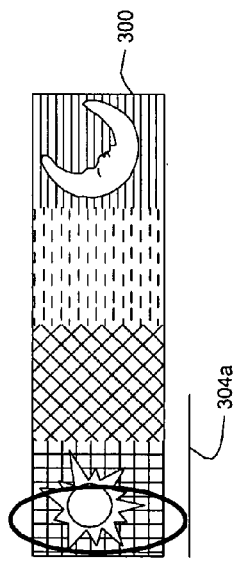
Figure 3E:
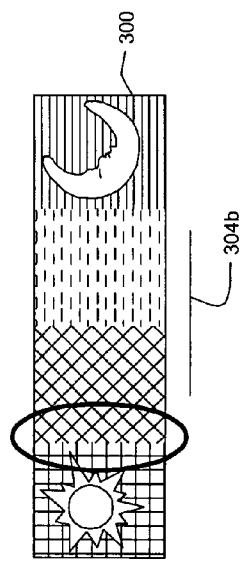
Figure 3F:
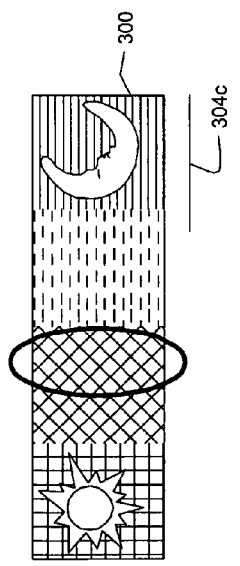

Optionally, the vertical dark oval used to indicate the time of day along the rectangle is replaced for second and third shift workers by a vertical red rectangle to indicate the graphical representation has taken into account the participant's shift adjustment. A person working first shift is assumed to be the default representation and would appear using the vertical dark oval marker. A person working second or third shift would appear using the vertical rectangular red marker. For example, a person who works second shift, whose local time is 5 PM, appears with a red rectangular marker appearing over the first sixth of the horizontal rectangle. For a first shift worker, a vertical dark oval marker in the first sixth of the horizontal rectangle indicates morning local time as illustrated in FIG. 3(A), but the presence of the vertical red rectangular marker implies that it is like morning for this second shift worker (it is the start of their business day). As another example, a person who works third shift, whose local time is 11 PM, appears with a red rectangular marker appearing over the first sixth of the horizontal rectangle. For a first shift worker, a vertical dark oval marker in the first sixth of the horizontal rectangle indicates morning local time as illustrated in FIG. 3(A), but the presence of the vertical red rectangular marker implies that it is like morning for this third shift worker (it is the start of their business day). Accordingly, the vertical red rectangular marker can appear in the same locations as was previously described for the vertical dark oval, but indicating how far into the normalized business day that participant is after adjusting the local time of the participant relative to the shift they are working.

Figure 4:
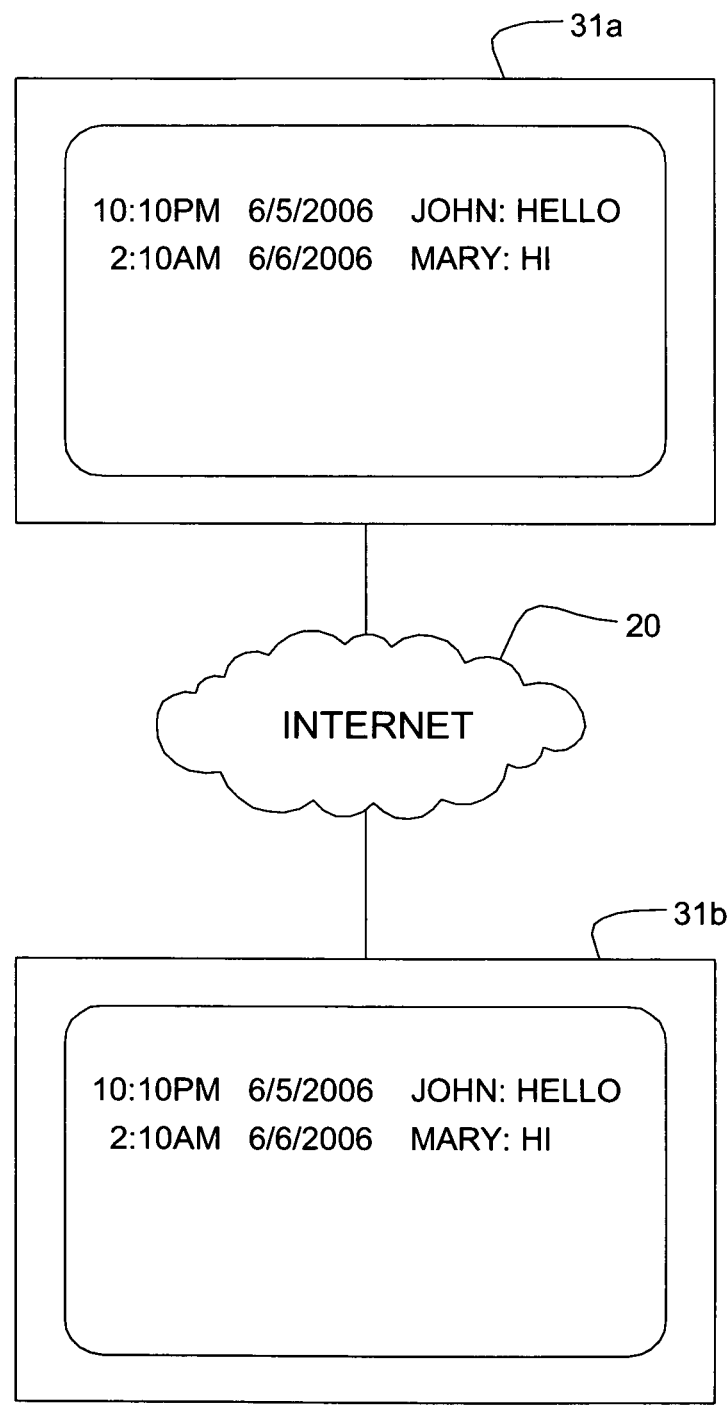
FIG. 4 illustrates two displays of client workstations where the current local times of different participants are accompanied by the current local dates of the different participants.

In some cases, different participants in different time zones will actually have different local days/dates than other participants. Optionally, in step 114, chat session server program 50 determines the current date of each participant, and compares the current date of each participant to the current date of each other participant. If there are any differences, then in step 118, chat session program 50 sends to each participant the current date of each other participant, and each chat session client program displays the current date of each other participant adjacent to the identity of each other participant. FIG. 4 illustrates an example of such a display.

Optionally, if the current local date of a participant is different from that of a viewer, then an arrow or pointer is added to one side edge of the rectangular graphical icon to indicated the difference in date. The arrow or pointer can appear attached to the left side of the horizontal rectangular icon, pointing to the left, to indicate that the date of the participant is one day earlier than the viewer. The arrow or pointer can appear attached to the right side of the horizontal rectangular icon, pointing to the right, to indicate that the date of the participant is one day later than the viewer. The absence of an arrow pointer on either side of the horizontal rectangle indicates that the participant's local time is the same date as the viewer.

It should also be noted that the graphical icon described above may be vertical instead of horizontal in which case all elements of are rotated 90 degrees, and convey the same meanings as described above. Chat session client programs 40a,b,c,d can be loaded into workstations 12a,b,c,d respectively from computer readable media 43a,b,c,d such as magnetic disk or tape, optical media, DVD, semiconductor memory, memory stick, etc. or downloaded from the Internet 20 via respective TCP/IP adapter cards 45a,b,c,d.

Chat session server program 50 can be loaded into server 14 from computer readable media 49 such as magnetic disk or tape, optical media, DVD, semiconductor memory, memory stick, etc. or downloaded from the Internet 20 via TCP/IP adapter cards 47.

Based on the foregoing, a system, method and computer program product for managing chat sessions have been disclosed. However, numerous modifications and substitutions can be made without deviating from the scope of the present invention. For example, the graphical representation of the business time of day (icon) can vary from what was shown in FIGS. 3(A-F) while still maintaining and conveying the meanings to the viewer. Also, the icon itself can become an interactive user interface selection control versus a static representation of time of day. In that case, the vertical dark oval becomes a "slider" able to be manipulated by the user's mouse, similar to the well known windows slider/scroll bar navigation widget used to control window behavior. A user manipulating the vertical dark oval "slider" back and forth on the horizontal rectangle, requests the chat client program to display a subset of the predefined "buddy" list of users whose time of day matches the position on the horizontal rectangle. Such people would be suited to participate in a live chat session. For example, assume the chat session client program has discovered the times of day for all "buddies" in the "buddy" list and has constructed or obtained the graphical icon representation for each. Assume also that a subset of the buddies are currently in the "morning" hours of their day. A user manipulating the slider to the first of the six positions along the horizontal rectangle, would cause the chat session client program to select the subset from the "buddy" list and display just the records for the subset to the viewer on the user interface. Therefore, the present invention has been disclosed by way of illustration and not limitation, and reference should be made to the following claims to determine the scope of the present invention.

What is claimed:

1. A method for managing a chat session having a plurality of participants, the method comprising the steps of:
   a server computer identifying a local time for each participant in the plurality of participants in the chat session;
   the server computer generating a time icon for the each participant in the plurality of participants in the chat session, wherein the time icon comprises an icon identifying different times of a day and an indicator located in a position relative to the icon in which the position of the indicator identifies the local time for the each participant in the plurality of participants in the chat session; and
   the server computer sending to the each participant in the chat session, the time icon including a current local time of each of other participants in the chat session in a manner to cause a workstation for the each participant in the chat session to display an identity and the time icon of the each of the other participants in the chat session.

2. A method as set forth in claim 1, wherein a graphical representation of the current local time of the each of the other participants in the chat session is displayed.

3. A method as set forth in claim 1 further comprising:
   the server computer sending to the each participant in the chat session the identity of the each of the other participants in the chat session.

4. A method as set forth in claim 1, wherein the workstation displays a window with text fields for respective messages entered or sent by respective participants in the chat session along with the identity of a sender of each of the respective messages.

5. A method as set forth in claim 1 further comprising:
   the server computer sending to the each participant in the chat session a current date of the each of the other participants in the chat session, wherein the workstation of the each participant in the chat session displays the current date of the each of the other participants in the chat session.

6. The method as set forth in claim 1 further comprising:
   the server computer identifying a work shift for the each participant in the plurality of participants in the chat session;
   the server computer generating a time icon for the each participant in the plurality of participants in the chat session, wherein the time icon indicates the local time and the work shift for the each participant in the plurality of participants in the chat session, and
   wherein the step of the server program sending to the each participant in the chat session, the current local time of the each of the other participants in the chat session in a manner to cause the workstation of the each participant in the chat session displays the identity and the current local time of the each of the other participants in the chat session comprises:
   the server computer sending to the each participant in the chat session, the time icon including an indication of the current local time of the each of the other participants in the chat session in a manner that causes the workstation of the each participant in the chat session to display the identity and the time icon of the each of the other participants in the chat session.

7. The method of claim 6, wherein the time icon comprises an icon identifying different times of a day, a first indicator located in a first position relative to the icon in which the first position of the first indicator identifies the local time and a second indicator located in a second position relative to the icon in which the second position of the second indicator indicates the work shift.

8. The method of claim 7, wherein the first indicator is an oval and the second indicator is a line segment.

9. The method of claim 1 further comprising:
   the server computer sending to the each participant in the chat session, an indication of a work shift of each of the other participants in the chat session to cause the workstation of the each participant in the chat session to display the indication of the work shift of the each of the other participants in the chat session.

10. A system for managing a chat session having a plurality of participants, the system comprising:
    a computer system comprising a CPU, a computer-readable tangible storage device, and a computer-readable memory;
    program instructions for a server program that identify a local time for each participant in the plurality of participants in the chat session;
    program instructions for the server program that generate a time icon for the each participant in the plurality of participants in the chat session, wherein the time icon comprises an icon identifying different times of a day and an indicator located in a position relative to the icon in which the position of the indicator identifies the local time for the each participant in the plurality of participants in the chat session; and
    program instructions for the server program that send to each participant in the plurality of participants in the chat session, the time icon including a current local time of each of other participants in the chat session, wherein the program instructions are stored on the computer-readable tangible storage device for execution by the CPU via the computer-readable memory in the computer system in a manner to cause a workstation for the each participant in the plurality of participants in the chat session to display an identity and the time icon of the each of the other participants in the plurality of participants in the chat session in response to receiving the time icon of the each of the other participants in the chat session.

11. A system as set forth in claim 10, wherein each workstation for a participant in a plurality of workstations displays a graphical representation of the current local time of the each of the other participants in the chat session.

12. A system as set forth in claim 10, wherein the server program sends to the each participant in the chat session the identity of the each of the other participants in the chat session.

13. A system as set forth in claim 11, wherein the each workstation for the participant in the plurality of workstations further displays a window with text fields for respective messages entered or sent by respective participants in the chat session along with the identity of an author of each of the respective messages.

14. A system as set forth in claim 10, wherein the server program sends to the each participant in the chat session a current date of the each of the other participants in the chat session to cause the each workstation of the each participant in the chat session to display the current date of the each of the other participants in the chat session in response to receiving the current date of the each of the other participants in the chat session.

15. The system of claim 10, wherein the program instructions for the server computer sends to the each participant in the plurality of participants in the chat session an indication of a work shift for the each of the other participants in the chat session to cause the workstation for the each participant in a plurality of workstations for the plurality of participants in the chat session to display the indication of the work shift for the each of the other participants in the chat session.

16. A computer program product for managing a chat session having a plurality of participants, the computer program product comprising:
a computer-readable tangible storage device;
first program instructions, for execution in a server, to identify a local time for each participant in the plurality of participants in the chat session;
second program instructions, for execution in the server, to generate a time icon for the each participant in the plurality of participants in the chat session, wherein the time icon comprises an icon identifying different times of a day and an indicator located in a position relative to the icon in which the position of the indicator identifies the local time for the each participant in the plurality of participants in the chat session; and
second program instructions, for execution in the server, to initiate sending to each participant in the plurality of participants in the chat session, the time icon including a current local time of each of other participants in the chat session in a manner to cause a workstation for the each participant in the plurality of participants in the chat session to initiate a display of an identity and the time icon of the each of the other participants in the chat session in response to receipt of the time icon of the each of the other participants in the chat session; and wherein the first program instructions, second program instructions, and third program instructions are stored on the computer-readable tangible storage device.

17. A computer program product as set forth in claim 16, wherein a plurality of workstations display a graphical representation of the current local time of the each of the other participants in the chat session.

18. A computer program product as set forth in claim 16 further comprising second program instructions to initiate sending to the each participant in the chat session the identity of the each of the other participants in the chat session; and wherein the second program instructions are stored on the computer-readable tangible storage device.

19. A computer program product as set forth in claim 16, wherein each workstation displays a window with text fields for respective messages entered or sent by respective participants in the chat session along with the identity of an author of each of the respective messages.

20. A computer program product as set forth in claim 16 further comprising:
fourth program instructions, for execution in the server, to initiate sending to the each participant in the chat session a current date of the each of the other participants in the chat session wherein the fourth program instructions are stored on the computer-readable tangible storage device, and wherein each workstation of the each participant in the chat session initiates display of the current date of the each of the other participants in the chat session in response to receiving the current date of the each of the other participants in the chat session.

21. The computer program product of claim 16 further comprising: second program instructions, for execution in the server, to initiate sending to the workstation for the each participant in the plurality of participants in the chat session an indication of a work shift for the each of the other participants in the chat session to cause the workstation for the each participant in the plurality of participants in the chat session to display the indication of the work shift for the each of the other participants in the chat session, wherein the second program instructions are stored on the computer-readable tangible storage device.

* * * * *